US012673394B2

(12) United States Patent (10) Patent No.: US 12,673,394 B2
Takeichi et al. (45) Date of Patent: Jul. 7, 2026

(54) NON-TRANSITORY COMPUTER-READABLE STORAGE MEDIUM AND STATE MANAGEMENT METHOD

(71) Applicant: NIDEK CO., LTD., Gamagori (JP)

(72) Inventors: Kyoji Takeichi, Gamagori (JP); Takamitsu Isogai, Gamagori (JP)

(73) Assignee: NIDEK CO., LTD., Gamagori (JP)

( * ) Notice: Subject to any disclaimer, the term of this patent is extended or adjusted under 35 U.S.C. 154(b) by 371 days.

(21) Appl. No.: 18/497,546

(22) Filed: Oct. 30, 2023

(65) Prior Publication Data

US 2024/0075577 A1    Mar. 7, 2024

Related U.S. Application Data

(63) Continuation of application No. PCT/JP2021/018635, filed on May 17, 2021.

(51) Int. Cl.
   *B24B 9/14*          (2006.01)
   *G05B 19/418*        (2006.01)
(52) U.S. Cl.
   CPC ........ *B24B 9/148* (2013.01); *G05B 19/41875* (2013.01)
(58) Field of Classification Search
   CPC ... B24B 9/148; B24B 49/02; G05B 19/41875; G05B 19/406; G05B 19/4097; G05B 2219/45157
   See application file for complete search history.

(56) References Cited

U.S. PATENT DOCUMENTS

| | | | |
|---|---|---|---|
| 5,485,399 A | 1/1996 | Saigo et al. | |
| 6,123,604 A | 9/2000 | Mizuno et al. | |
| 2007/0097525 A1* | 5/2007 | Guillermin | B24B 47/22 |
| | | | 359/819 |
| 2007/0291268 A1 | 12/2007 | Samukawa | |
| 2010/0248590 A1 | 9/2010 | Shibata et al. | |
| 2013/0055540 A1 | 3/2013 | Schneider et al. | |
| 2015/0314411 A1* | 11/2015 | Samukawa | B24B 49/12 |
| | | | 451/5 |

(Continued)

FOREIGN PATENT DOCUMENTS

| | | | | | |
|---|---|---|---|---|---|
| CN | 103826798 A | * | 5/2014 | | B24B 1/00 |
| EP | 0839604 A1 | * | 5/1998 | | B24B 49/16 |

(Continued)

OTHER PUBLICATIONS

Extended European Search Report dated Jun. 5, 2025 issued by the European Patent Office in European Patent Application No. 21940688.1.

(Continued)

*Primary Examiner* — Mong-Shune Chung
(74) *Attorney, Agent, or Firm* — Sughrue Mion, PLLC

(57) ABSTRACT

A processor of a control apparatus, which controls an eyeglasses lens machining apparatus, performs a check operation execution step (S14, S17, S19, and S21 to S23) and a result output step (S24), based on a state management program. In the check operation execution step, the processor causes the eyeglasses lens machining apparatus to execute a check operation for checking a state of the eyeglasses lens machining apparatus. In the result output step, the processor outputs information indicating a result of the executed check operation.

9 Claims, 7 Drawing Sheets

(56) References Cited

U.S. PATENT DOCUMENTS

2019/0118498 A1     4/2019  Kanda et al.

FOREIGN PATENT DOCUMENTS

| | | | | |
|---|---|---|---|---|
| EP | 0576268 | B1 | | 9/2000 |
| EP | 0839604 | B1 | | 2/2002 |
| EP | 1862258 | A2 | | 12/2007 |
| JP | 2003223205 | A | * | 8/2003 |
| JP | 2004-164179 | A | | 6/2004 |
| JP | 2005-46938 | A | | 2/2005 |
| JP | 2005-346655 | A | | 12/2005 |
| JP | 2008310402 | A | * | 12/2008 |
| JP | 2010-234510 | A | | 10/2010 |
| JP | 2013-521141 | A | | 6/2013 |
| JP | 2014-193501 | A | | 10/2014 |
| JP | 2014-198360 | A | | 10/2014 |
| JP | 2016-55365 | A | | 4/2016 |
| JP | 2018-4930 | A | | 1/2018 |
| JP | 2021-24055 | A | | 2/2021 |
| JP | 2021024055 | A | * | 2/2021 |

OTHER PUBLICATIONS

International Search Report (PCT/ISA/210) issued on Jul. 20, 2021 by the International Searching Authority in International Patent Application No. PCT/JP2021/018635.
Written Opinion (PCT/ISA/237) issued on Jul. 20, 2021 by the International Searching Authority in International Patent Application No. PCT/JP2021/018635.

* cited by examiner

NON-TRANSITORY COMPUTER-READABLE STORAGE MEDIUM AND STATE MANAGEMENT METHOD

CROSS-REFERENCE TO RELATED APPLICATIONS

This is a continuation of International Application No. PCT/JP2021/018635 filed on May 17, 2021, the entire content of which is incorporated herein by reference.

TECHNICAL FIELD

The present disclosure relates to a non-transitory computer-readable storage medium storing a state management program and a state management method for managing a state of an eyeglasses lens machining apparatus.

BACKGROUND ART

An eyeglasses lens machining apparatus that performs machining on an eyeglasses lens is widely used in an eyeglasses lens shop and the like. For example, an eyeglasses lens machining apparatus described in JP2018-004930A holds an eyeglasses lens by attaching a lens holding shaft to a cup attached to the eyeglasses lens. The eyeglasses lens machining apparatus can perform machining a peripheral edge of the held eyeglasses lens with a peripheral edge machining tool. Further, the eyeglasses lens machining apparatus described in JP2018-004930A can form a hole at the held eyeglasses lens with a drilling tool.

In a case where an operation defect occurs in the eyeglasses lens machining apparatus, it is desirable to execute appropriate measures (for example, repair, replacement of components, change of settings, and the like) according to a content of the operation defect on the eyeglasses lens machining apparatus. Here, even when the contents of the operation defects that occur are the same, causes of the operation defects are different from each other, in many cases. A skilled person who is familiar with management of the eyeglasses lens machining apparatus can reduce the man-hours and a time when the measures are actually performed, for example, by inquiring about a situation of the apparatus in advance, checking information indicating an operation of the apparatus in advance, or the like. Meanwhile, in the current situation, when the skilled person cannot be involved, there is a high frequency with which appropriate measures are not performed on the eyeglasses lens machining apparatus.

SUMMARY OF INVENTION

A typical object of the present disclosure is to provide a non-transitory computer-readable storage medium storing a state management program and a state management method, which enable to appropriately manage a state of an eyeglasses lens machining apparatus.

A first aspect of the present disclosure relates to a non-transitory computer-readable storage medium storing a state management program executed by a control apparatus configured to control an eyeglasses lens machining apparatus in order to manage a state of the eyeglasses lens machining apparatus, the state management program including instructions which, when executed by a processor of the control apparatus, cause the control apparatus to perform: a check operation execution step of causing the eyeglasses lens machining apparatus to execute a check operation for checking a state of the eyeglasses lens machining apparatus; and a result output step of outputting information indicating a result of the executed check operation.

A second aspect of the present disclosure relates to a state management method performed by a control apparatus that controls an eyeglasses lens machining apparatus in order to manage a state of the eyeglasses lens machining apparatus, the state management method including: a check operation execution of causing the eyeglasses lens machining apparatus to execute a check operation for checking a state of the eyeglasses lens machining apparatus; and a result output of outputting information indicating a result of the executed check operation.

A third aspect of the present disclosure relates to a state management method of an eyeglasses lens machining apparatus, which is performed in an eyeglasses lens machining system including the eyeglasses lens machining apparatus that machines an eyeglasses lens and an information processing apparatus that enables to acquire information related to the eyeglasses lens machining apparatus, the state management method including: a check operation execution in which the eyeglasses lens machining apparatus executes a check operation for checking a state; a result output in which the eyeglasses lens machining apparatus outputs result information indicating a result of the executed check operation; and an analysis in which the information processing apparatus acquires the result information output in the result output step, and analyzes the acquired result information by using an analysis tool constructed in advance.

According to the non-transitory computer-readable storage medium storing the state management program and the state management method of the present disclosure, a state of the eyeglasses lens machining apparatus is appropriately managed.

The state management program described in the present disclosure is executed by the control apparatus that controls the eyeglasses lens machining apparatus to manage the state of the eyeglasses lens machining apparatus. The processor of the control apparatus performs the check operation execution step and the result output step. In the check operation execution step, the processor causes the eyeglasses lens machining apparatus to execute the check operation for checking the state of the eyeglasses lens machining apparatus. In the result output step, the processor outputs the information indicating the result of the executed check operation.

With the state management program described in the present disclosure, unlike a case where only an error output or the like is performed, the check operation for checking the state of the eyeglasses lens machining apparatus is executed by the eyeglasses lens machining apparatus, and the information indicating the result of the check operation is output. Therefore, it becomes easy to estimate the state of the eyeglasses lens machining apparatus (for example, a cause of operation defect or the like) based on the result of the check operation. Therefore, it becomes easier to perform appropriate processing on the eyeglasses lens machining apparatus.

The check operation in the present disclosure is an operation executed to check the state of the eyeglasses lens machining apparatus with as high accuracy as possible. For example, in some cases, the check operation is executed by the eyeglasses lens machining apparatus to check the cause of the operation defect that has a possibility of occurring in the eyeglasses lens machining apparatus in more detail. The check operation may be an operation (that is, a dedicated operation for state check) executed separately from the operation (for example, at least one of a machining operation, a measurement operation, a communication operation, and the like) that is actually necessary to be executed to fit the eyeglasses lens into a frame. In this case, the cause of the operation defect is estimated more appropriately. Meanwhile, at least a part of the check operation may include an operation actually performed to fit the eyeglasses lens in the frame (for example, a machining operation executed on the eyeglasses lens, and the like).

The control apparatus that controls the operation of the eyeglasses lens machining apparatus may be the eyeglasses lens machining apparatus itself, or may be another device (for example, a PC or the like) connected to the eyeglasses lens machining apparatus. That is, the device that executes the eyeglasses lens machining control program according to the present disclosure is not limited to the eyeglasses lens machining apparatus. In addition, processors of a plurality of devices may cooperate to execute the eyeglasses lens machining control program.

The processor may further execute an operation defect information acquisition step. In the operation defect information acquisition step, operation defect information indicating a content of an operation defect in the eyeglasses lens machining apparatus is acquired. In the operation check execution step, a check operation for checking a cause of the operation defect indicated by the acquired operation defect information may be executed. In this case, the cause of the operation defect of the eyeglasses lens machining apparatus (for example, an operation defect that actually occurs in the eyeglasses lens machining apparatus, an operation defect that has a possibility of occurring in the eyeglasses lens machining apparatus, or the like) is appropriately checked based on the result of the check operation.

In the check operation execution step, among a plurality of the check operations, one or a plurality of check operations associated with the acquired operation defect information (that is, corresponding to the content (type) of the operation defect indicated by the operation defect information) may be executed by the eyeglasses lens machining apparatus. In this case, unlike a case or the like where only an output of an error is simply executed, the check operation corresponding to the content of the operation defect is executed by the eyeglasses lens machining apparatus, and the information indicating the result of the check operation is output. Therefore, it is easier to estimate the cause of the operation defect based on the result of the check operation. Therefore, it becomes easier to perform appropriate processing on the eyeglasses lens machining apparatus. In addition, since a check operation is performed according to the content of the operation defect (for example, check operation for a portion highly related to actual operation defects) among the plurality of check operations, the cause of the operation defect can be estimated more efficiently as compared with a case where all the check operations are always performed.

A method of associating the operation defect information (for example, the content of the operation defect indicated by the operation defect information) with the check operation to be executed by the eyeglasses lens machining apparatus can be appropriately selected. For example, data (for example, table data or the like) in which each of a plurality of operation defect information is associated with the content of the check operation to be executed by the eyeglasses lens machining apparatus may be stored in a storage device such as a database in advance. The processor may refer to the data stored in the storage device to select a check operation associated with the acquired operation defect information as the check operation to be executed by the eyeglasses lens machining apparatus. Further, a program may be constructed in advance such that processing of selecting a predetermined check operation for each operation defect information is performed.

In a case where the eyeglasses lens machining apparatus detects an operation defect that occurs in the apparatus, in the operation defect information acquisition step, the processor may acquire operation defect information indicating a content of the detected operation defect. In this case, the content of the check operation to be executed by the eyeglasses lens machining apparatus is automatically selected according to the content of the operation defect detected by the eyeglasses lens machining apparatus. Therefore, the cause of the detected operation defect is estimated more appropriately.

In the operation defect information acquisition step, the processor may acquire operation defect information input by a user. In this case, for example, even in a case where the operation defect is not detected by the eyeglasses lens machining apparatus, the user can check workmanship or the like of the actually machined eyeglasses lens in person to cause the eyeglasses lens machining apparatus to appropriately execute the check operation for checking the cause of the operation defect that occurs.

In this manner, the operation defect information may include at least one of information indicating the content of the operation defect detected by the eyeglasses lens machining apparatus itself and the operation defect information input by the user.

In a case where a content of an operation defect indicated by the operation defect information is an operation defect related to machining on an edge shape of the eyeglasses lens (for example, an operation defect causing a deviation in at least one of a shape, a position, and a size of a formed edge portion), the check operation may include a check operation on an X-axis movement motor and a lens pressure measurement unit. The X-axis movement motor moves the eyeglasses lens in a direction along lens holding shafts (referred to as "lens chuck shafts" in some cases) that hold the eyeglasses lens by interposing the eyeglasses lens between the lens holding shafts. The lens thickness measurement unit measures a thickness of the eyeglasses lens. As the cause of the operation defect related to the machining on the edge shape, a case where a defect occurs in movement in the direction along the lens holding shaft (that is, in the thickness direction of the lens), a case where a defect occurs in measuring the thickness of the lens, a case where both defects occur, and the like are conceivable. Therefore, when checking the cause of the operation defect related to machining on the edge shape, the cause of the operation defect can be estimated more appropriately by performing the check operation on the X-axis movement motor and the lens thickness measurement unit. The edge shape of the machined eyeglasses lens includes at least one shape such as a bevel, a groove, a foot portion, and a chamfer portion in the edge portion of the lens.

Meanwhile, a specific method for causing the eyeglasses lens machining apparatus to execute the check operation can be selected as appropriate. For example, in the check operation execution step, all of the plurality of check operations may be performed. In this case, the states of many portions in the eyeglasses lens machining apparatus are appropriately estimated based on the result of the check operation. The processor may cause the eyeglasses lens machining apparatus to execute all of the plurality of check operations, for example, when regular maintenance is performed on the eyeglasses lens machining apparatus. Further, the processor may cause the eyeglasses lens machining apparatus to execute all of the plurality of check operations when a certain operation defect occurs in the eyeglasses lens machining apparatus.

The check operation executed in the check operation execution step may include a movement amount check operation of performing an instruction for causing at least one motor provided in the eyeglasses lens machining apparatus to move a target object by a predetermined amount. In a case where the movement amount check operation is executed, information indicating a relationship between a movement amount instructed to the motor and a movement amount of the target object actually moved may be output in the result output step. In this case, it is easier to appropriately determine whether the cause of the operation defect is a defect related to the movement amount of the target object by the motor, based on the result of the operation check. Therefore, it becomes easier to perform appropriate processing on the eyeglasses lens machining apparatus.

The check operation executed in the check operation execution step may include a datum movement check operation of causing at least one motor provided in the eyeglasses lens machining apparatus to move the target object to a datum position. In a case where the datum movement check operation is executed, information indicating a detection result of a datum position may be output in the result output step. In this case, it is easier to appropriately determine whether the cause of the operation defect is a defect related to the detection of the motor at the datum position, based on the result of the operation check. Therefore, it becomes easier to perform appropriate processing on the eyeglasses lens machining apparatus. In particular, in a case where a photo sensor or the like is used as a datum sensor in the eyeglasses lens machining apparatus, light of the photo sensor is blocked by machining waste or the like and a defect occurs in the datum detection, in many cases. On the other hand, by causing the eyeglasses lens machining apparatus to execute the datum movement check operation, it becomes easier to appropriately resolve the defect in the datum detection that is likely to occur due to machining waste or the like.

A specific method for executing the datum movement check operation can be selected as appropriate. For example, the processor may acquire the detection result of the datum position each time the target object is repeatedly moved to the datum position a plurality of times. In this case, the cause of the operation defect can be more accurately estimated depending on whether the datum is accurately detected each time movement to the datum position is performed the plurality of times.

In the result output step, the processor may output result information of the check operation by causing the display unit to display an identifier indicating the result information. In this case, the operator (for example, the user of the eyeglasses lens machining apparatus, or the like) can appropriately process the result information by causing an identifier reader provided in a terminal apparatus or the like to read the identifier displayed on the display unit. For example, the operator can operate the terminal apparatus or the like to transmit the result information to another device (for example, an information processing apparatus or the like managed by a manufacturer of the eyeglasses lens machining apparatus). Therefore, even when the eyeglasses lens machining apparatus and the control apparatus are not connected to a network, the result information can be appropriately transmitted via the network. It is also possible to analyze the result information by using a device (for example, a terminal apparatus or the like) different from the control apparatus.

Meanwhile, it is also possible to change the output method of the result information of the check operation. For example, the control apparatus (which may be the eyeglasses lens machining apparatus) may output the result information by transmitting the result information to another device via the Internet, NFC, Wi-Fi, Bluetooth (registered trademark), wired communication, or the like. Further, the control apparatus may output the result information by causing the display unit to display the result information of the check operation.

In addition, a form of the output result information can be selected as appropriate. For example, a parameter, a graph, image data (for example, a still image, a moving image, or the like obtained by imaging at least a part of motor operation), and sound data (for example, motor sound or the like) indicating the result of the check operation may be output as the result information.

The technique described in the present disclosure can also be expressed in aspects other than an information management program (for example, state management method, state management apparatus, eyeglasses lens machining apparatus, eyeglasses lens machining system, state management system, and the like).

The eyeglasses lens machining system described in the present disclosure includes the eyeglasses lens machining apparatus that performs machining on the eyeglasses lens, and the information processing apparatus that enables to acquire information on the eyeglasses lens machining apparatus. The eyeglasses lens machining system performs the check operation execution step, the result output step, and the analysis step. In the check operation execution step, the eyeglasses lens machining apparatus executes a check operation for checking a state. In the result output step, the eyeglasses lens machining apparatus outputs result information indicating a result of the executed check operation. In the analysis step, the information processing apparatus acquires the result information output in the result output step, and analyzes the acquired result information by using an analysis tool constructed in advance.

In this case, after the check operation for checking the state of the eyeglasses lens machining apparatus is executed by the eyeglasses lens machining apparatus, the result information indicating the result of the check operation is analyzed by the information processing apparatus that is a device different from the eyeglasses lens machining apparatus. Therefore, even when the analysis tool is not mounted in each eyeglasses lens machining apparatus (or the control apparatus connected to the eyeglasses lens machining apparatus), the result information of the check operation can be appropriately analyzed by the analysis tool.

Meanwhile, it is also possible to change the method of analysis using the analysis tool. For example, the analysis tool may be mounted on the eyeglasses lens machining apparatus or the control apparatus connected to the eyeglasses lens machining apparatus. In this case, the result of the check operation is appropriately analyzed on each eyeglasses lens machining apparatus side.

A specific aspect of the analysis tool can also be selected as appropriate. For example, spreadsheet software, an application, or the like, in which algorithms, standards, or the like for analyzing the result information are defined, may be used as the analysis tool. Further, a mathematical model pre-trained by machine learning algorithms may also be used as the analysis tool to output an analysis result by inputting the result information.

BRIEF DESCRIPTION OF DRAWINGS

Exemplary embodiment(s) of the present invention will be described in detail based on the following figures, wherein.

DESCRIPTION OF EMBODIMENTS

Hereinafter, one of the typical embodiments in the present disclosure will be described with reference to the drawings. First, an eyeglasses lens machining apparatus 1 of the present embodiment will be described. The eyeglasses lens machining apparatus 1 performs machining on an eyeglasses lens LE. The eyeglasses lens machining apparatus 1 according to the present embodiment also serves as a control apparatus that controls various operations and processing, such as a machining operation. Meanwhile, a control apparatus (for example, a personal computer or the like) that controls the eyeglasses lens machining apparatus 1 may be used separately from the eyeglasses lens machining apparatus 1.

(Mechanical Configuration)

Figure 1:
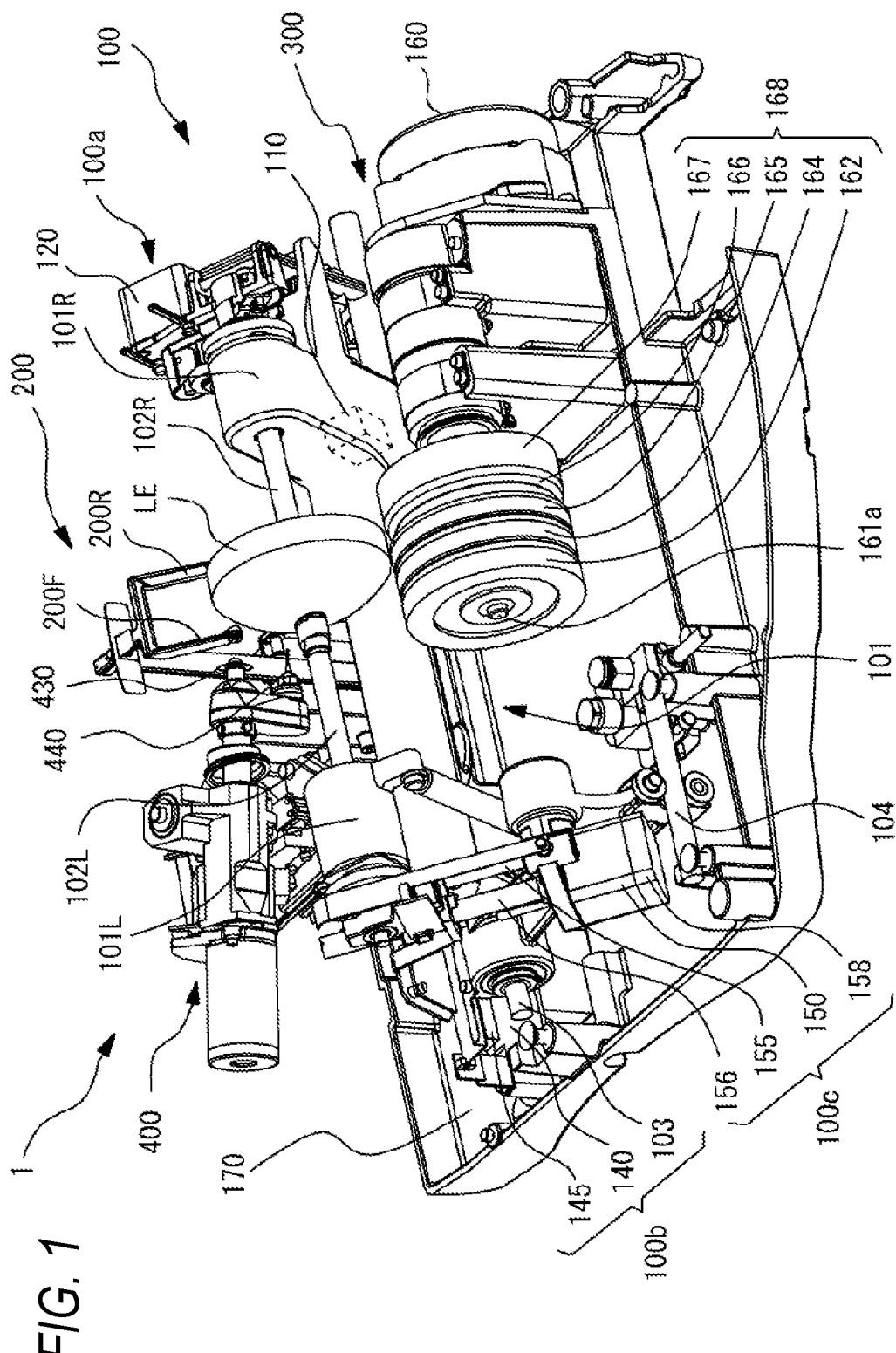
FIG. 1 is a schematic configuration diagram of a machining mechanism of an eyeglasses lens machining apparatus 1.

As illustrated in FIG. 1, the eyeglasses lens machining apparatus 1 of the present embodiment includes a lens holding portion 100, a lens shape measurement unit 200, a first machining tool unit 300, and a second machining tool unit 400. The lens holding portion 100 includes lens holding shafts (lens chuck shafts) 102R and 102L for holding the lens LE by interposing the lens LE between the lens holding shafts 102R and 102L. Further, the lens holding portion 100 includes a lens rotation unit 100a, a holding shaft moving unit 100b, and an inter-shaft distance changing unit 100c.

The lens rotation unit 100a rotates a pair of lens holding shafts 102R and 102L around their axes. The holding shaft moving unit 100b moves the lens holding shafts 102R and 102L in an axial direction (this is defined as an X-direction). The inter-shaft distance changing unit 100c moves the lens holding shafts 102R and 102L in a direction to be closer to or separated from a rotation shaft of a machining tool (details will be described below) provided in each of the first machining tool unit 300 and the second machining tool unit 400 (this is defined as a Y-direction). Further, the inter-shaft distance changing unit 100c changes a distance between the lens shape measurement unit 200 and the lens holding shafts 102R and 102L.

Hereinafter, a specific example of each configuration in the eyeglasses lens machining apparatus 1 will be described in detail. The lens holding portion 100 is mounted on a base 170 of a main body of the eyeglasses lens machining apparatus 1.

The lens rotation unit 100a will be described. The lens holding shaft 102R is held by a right arm 101R of a carriage 101 of the lens holding portion 100 and the lens holding shaft 102L is held by a left arm 101L of the carriage 101 of the lens holding portion 100 to be respectively rotatable and coaxial with each other. When the lens holding shaft 102R is moved toward the lens holding shaft 102L side by a motor 110 attached to the right arm 101R, the lens LE is interposed and held between the two lens holding shafts 102R and 102L. The two lens holding shafts 102R and 102L are synchronously rotated by a motor 120 attached to the right arm 101R.

The holding shaft moving unit 100b will be described. An X-axis movement support base 140 is provided at shafts 103 and 104 extending parallel to the lens holding shafts 102R and 102L and a grindstone rotation shaft 161a. The X-axis movement support base 140 can be moved in the X-axis direction along the shafts 103 and 104 by power of an X-axis movement motor 145. The carriage 101 is mounted on the X-axis movement support base 140. An encoder 146 (see FIG. 2) is provided on a rotation shaft of the X-axis movement motor 145. In the present embodiment, X-direction positions of the lens holding shafts 102R and 102L detected by the encoder 146 are used to measure shapes of a front surface and a rear surface of the lens LE.

The inter-shaft distance changing unit 100c will be described. A shaft 156 extending in a direction connecting the lens holding shafts 102R and 102L, and a grindstone rotation shaft 161a is fixed to the X-axis movement support base 140. In a case where a Y-axis movement motor 150 is rotated, a ball screw 155 extending in the Y-direction is rotated. As a result, the carriage 101 is moved along the shaft 156 in the Y-axis direction. An encoder 158 that detects a position of the carriage 101 in the Y-direction is provided on a rotation shaft of the Y-axis movement motor 150.

The lens shape measurement unit 200 will be described. The lens shape measurement unit 200 of the present embodiment is fixed to the base 170 at a position opposite to the first machining tool unit 300 via the carriage 101. The lens shape measurement unit 200 includes a lens edge position measurement unit 200F and a lens edge position measurement unit 200R. The lens edge position measurement unit 200F has a tracing stylus that contacts a front surface of the lens LE. The lens edge position measurement unit 200R has a tracing stylus that contacts a rear surface of the lens LE. When the carriage 101 is moved in the Y-axis direction based on target lens shape data, and the lens holding shafts 102R and 102L are rotated in a state in which the tracing stylus of each of the lens edge position measurement units 200F and 200R is in contact with the front surface and the rear surface of the lens LE, edge positions of the front surface and the rear surface of the lens LE are measured at the same time. The lens shape measurement unit 200 functions as a lens thickness measurement unit that measures a thickness of the lens LE. For the configuration of the lens edge position measurement units 200F and 200R, for example, the configuration or the like described in JP2003-145328A can be used.

The first machining tool unit 300 will be described. The first machining tool unit 300 includes a peripheral edge machining tool 168 which is one of lens machining tools. The peripheral edge machining tool 168 of the present embodiment includes a rough grindstone 162 for glass, a finishing grindstone 164 having a V-groove (beveling groove) for forming a bevel on a lens and a flat machining surface, a flat mirror finishing grindstone 165, a high curve lens finishing grindstone 166, a rough grindstone 167 for plastics, and the like. A plurality of grindstones of the peripheral edge machining tool 168 are coaxially attached to the grindstone rotation shaft (grindstone spindle) 161*a*. The grindstone rotation shaft 161 a is rotated by the motor 160. A peripheral edge of the lens LE held by the lens holding shafts 102L and 102R is pressure-welded and machined by the peripheral edge machining tool 168.

The second machining tool unit 400 will be described. The second machining tool unit 400 includes a finishing tool, a drilling tool, a motor 421, a motor 482, and the like. The finishing tool is rotated around a rotation axis to perform finishing on the peripheral edge of the lens LE (for example, at least one of grooving, beveling, step forming, and the like). The drilling tool forms a hole in the lens LE. The drilling tool of the present embodiment forms a hole extending in an axial direction in the lens LE by being moved in the axial direction while being rotated around the rotation axis. The motor 421 rotates the finishing tool and the drilling tool. The motor 482 pivots the finishing tool and the drilling tool.

(Electrical Configuration)

Figure 2:
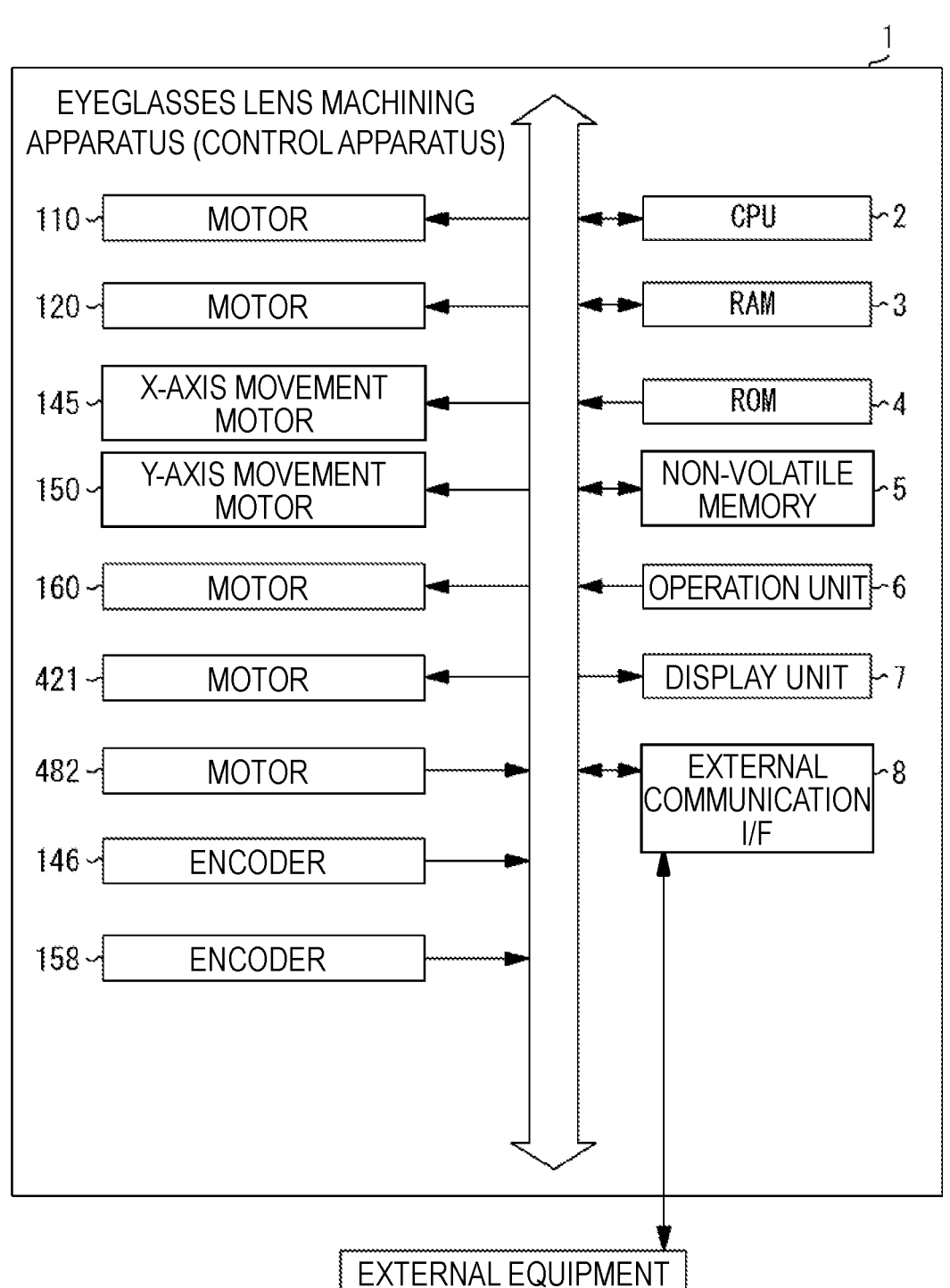
FIG. 2 is a block diagram illustrating an electric configuration of the eyeglasses lens machining apparatus 1.

With reference to FIG. 2, an electrical configuration of the eyeglasses lens machining apparatus (also serving as a control apparatus) 1 will be described. The eyeglasses lens machining apparatus 1 includes a CPU (processor) 2 that controls the eyeglasses lens machining apparatus 1. A RAM 3, a ROM 4, a non-volatile memory 5, an operation unit 6, a display unit (display) 7, and an external communication OF 8 are connected to the CPU 2 via a bus. Further, various devices such as the motors described above (the motor 110, the motor 120, the X-axis movement motor 145, the Y-axis movement motor 150, the motor 160, the motor 421, the motor 482, the encoder 146, and the encoder 158) are connected to the CPU 2 via the bus.

The RAM 3 temporarily stores various types of information. Various programs, initial values, and the like are stored in the ROM 4. The non-volatile memory 5 is a non-transitory storage medium (for example, flash ROM, hard disk drive, or the like) which can hold storage contents even when the supply of power is interrupted. The non-volatile memory may store a control program (for example, a state management program, or the like) for controlling the operation of the eyeglasses lens machining apparatus (control apparatus) 1. The operation unit 6 accepts an input of various instructions from an operator. For example, a touch panel provided on a surface of the display unit 7, an operation button, or the like may be used as the operation unit 6. The display unit 7 can display various images such as characters such as operation guidance, identifiers (for example, QR code (registered trademark) or the like), a shape of the lens LE, a shape of a frame, and the like. The external communication OF 8 connects the eyeglasses lens machining apparatus 1 to external equipment.

(System Configuration)

Figure 3:
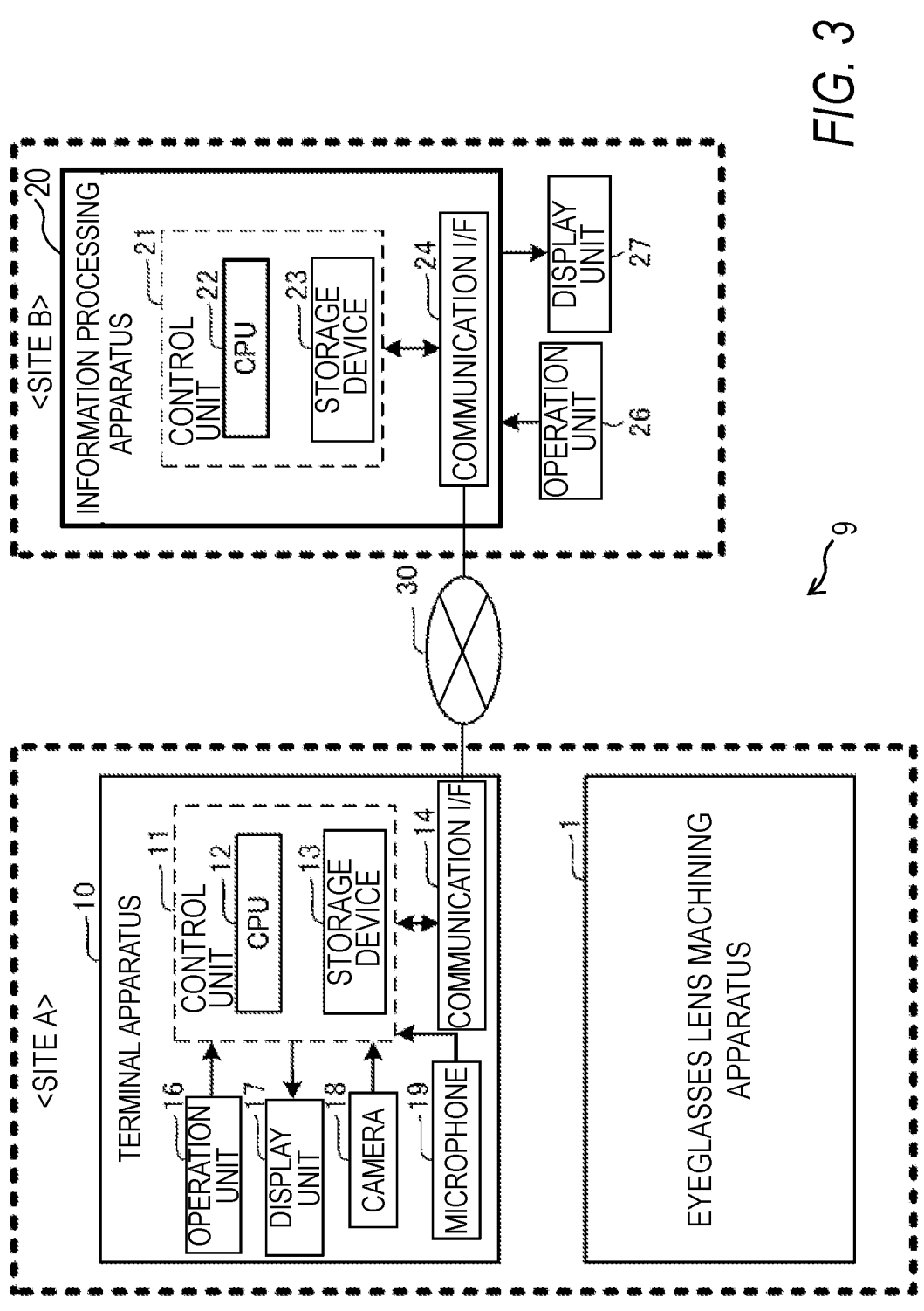
FIG. 3 is a block diagram illustrating a system configuration of an eyeglasses lens machining system 9.

With reference to FIG. 3, a system configuration of an eyeglasses lens machining system 9 according to the present embodiment will be schematically described. The eyeglasses lens machining system 9 of the present embodiment includes the eyeglasses lens machining apparatus 1 (see FIGS. 1 and 2), a terminal apparatus 10, and an information processing apparatus 20. The terminal apparatus 10 is used at a site (site A in the present embodiment) at which the eyeglasses lens machining apparatus 1 is installed. The information processing apparatus 20 is disposed at a site (site B in the present embodiment) different from the site at which the eyeglasses lens machining apparatus 1 is installed.

The information processing apparatus 20 can acquire information on the eyeglasses lens machining apparatus 1, and process the acquired information. In the present embodiment, the information on the eyeglasses lens machining apparatus 1 is transmitted to the information processing apparatus 20 via the terminal apparatus 10. Therefore, even in a case where the eyeglasses lens machining apparatus 1 is not connected to a network and the eyeglasses lens machining apparatus 1 and the information processing apparatus 20 are disposed at different sites, the information processing apparatus 20 can appropriately acquire information on the eyeglasses lens machining apparatus 1. Meanwhile, in a case or the like where the eyeglasses lens machining apparatus 1 is connected to a network, the terminal apparatus 10 can be omitted.

The terminal apparatus 10 is used by a user at the site A at which the eyeglasses lens machining apparatus 1 is installed. The user of the terminal apparatus 10 may be, for example, an agent operator entrusted with a part of a task of a manufacturer of the eyeglasses lens machining apparatus 1, a user himself or herself using the eyeglasses lens machining apparatus 1, or the like. The terminal apparatus 10 of the present embodiment is a mobile terminal such as a smart phone or a tablet terminal. Meanwhile, a device other than the mobile terminal (for example, a PC or the like) may be used as the terminal apparatus 10.

The terminal apparatus 10 includes a control unit 11 that performs various types of control processing, and a communication OF 14. The control unit 11 includes a CPU 12 which is a controller that performs control, and a storage device 13 which can store programs, data, and the like. The communication OF 14 connects the terminal apparatus 10 with external equipment (for example, the information processing apparatus 20) via a network 30 (for example, the Internet).

The terminal apparatus 10 includes an operation unit 16, a display unit (monitor) 17, a camera (photographing unit) 18, and a microphone (sound input unit) 19. The operation unit 16 is operated by a user in order for the user to input various instructions to the terminal apparatus 10. For the operation unit 16, at least one of, for example, a touch panel, a keyboard, a mouse, and the like can be used. The display unit 17 displays various images. The camera 18 captures various images. Although the details will be described below, the camera 18 of the present embodiment is also used as an identifier reader for reading an identifier. The microphone 19 inputs various sounds, and outputs signals corresponding to the sounds to the control unit 11. At least one of the operation unit 16, the display unit 17, the camera 18, and the microphone 19 may be external equipment that is not built into the terminal apparatus 10.

For example, a PC, a server, or the like can be used as the information processing apparatus 20. As an example, the PC is used for the information processing apparatus 20 of the present embodiment. In a case where the server is used as the information processing apparatus 20, the information processing apparatus 20 may be, for example, a server of a manufacturer that provides a cloud service (a so-called cloud server), or a server other than the cloud server (for example, a server of a manufacturer that manufactures the eyeglasses lens machining apparatus 1, and the like).

The information processing apparatus 20 includes a control unit 21 that performs various types of control processing and a communication OF 24. The control unit 21 includes a CPU 22 which is a controller that performs control, and a storage device 23 that can store programs, data, and the like. The communication OF 24 connects the information processing apparatus 20 with external equipment (for example, the terminal apparatus 10 or the like) via the network 30. In addition, the information processing apparatus 20 is connected to an operation unit 26 and a display unit 27.

(Operation Check Control Processing)

Figure 5:
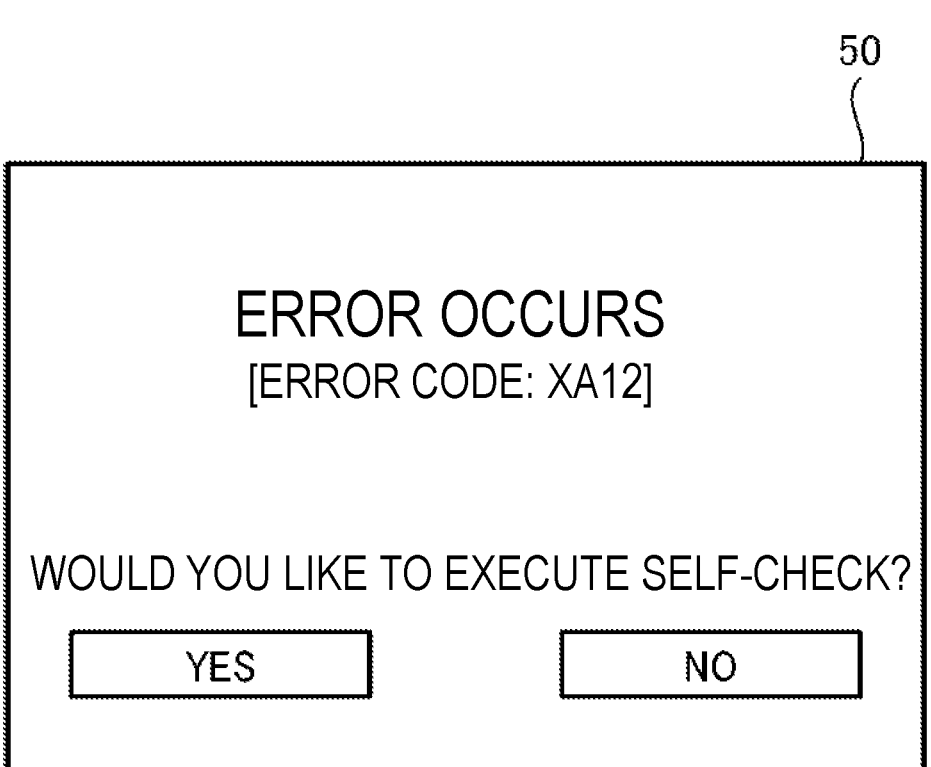
FIG. 5 is a diagram illustrating an example of an inquiry screen for error occurrence time 50.
Figure 6:
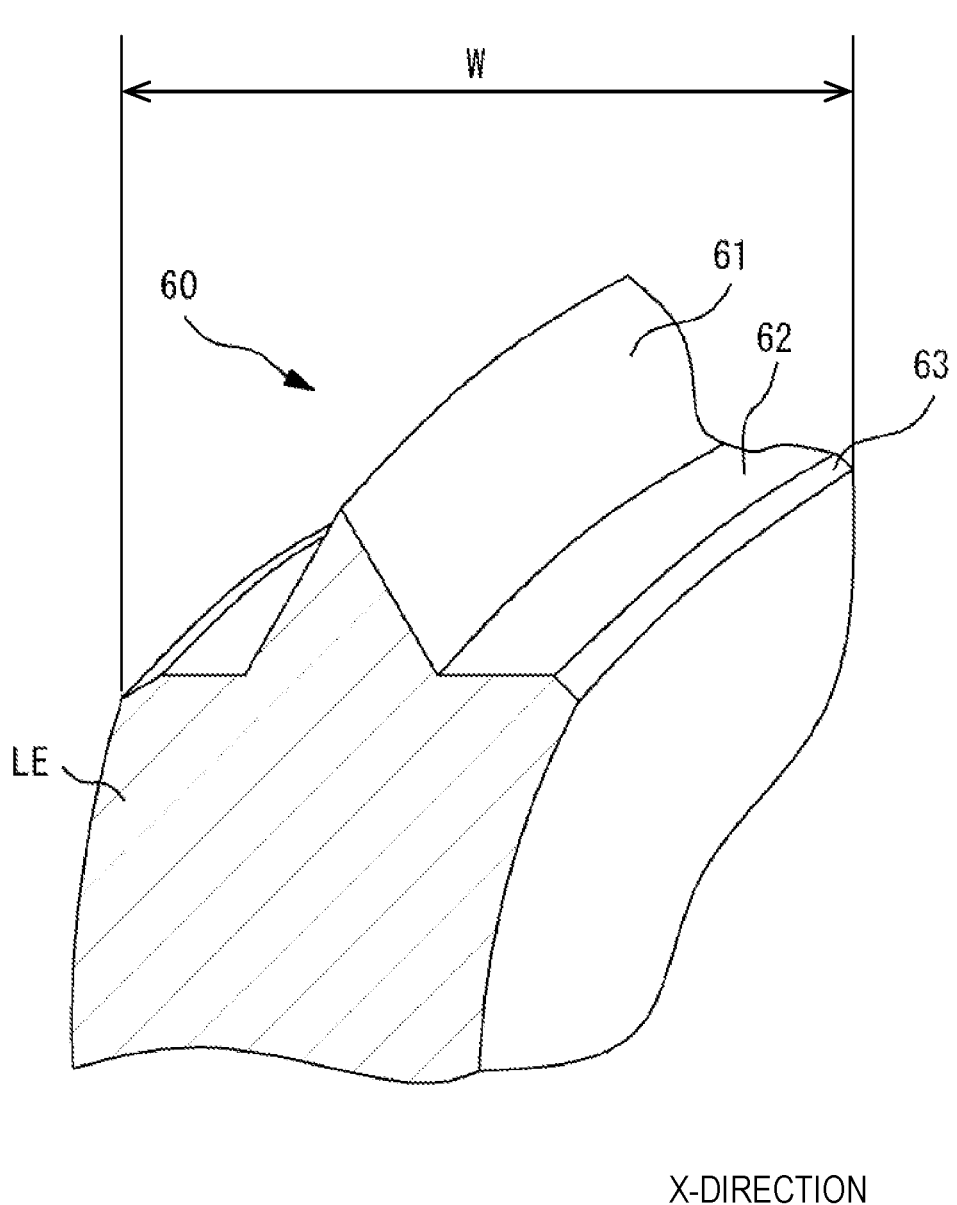
FIG. 6 is a perspective view illustrating an example of an edge portion 60 of a machined lens LE.

Operation check control processing executed by the control apparatus that controls the eyeglasses lens machining apparatus 1 will be described with reference to FIGS. 4 to 6. The operation check control processing illustrated in the present embodiment is executed by the CPU 2 of the eyeglasses lens machining apparatus (control apparatus) 1 according to a state management program stored in the non-volatile memory 5.

A check operation is an operation to be executed by the eyeglasses lens machining apparatus 1 to check a state of the eyeglasses lens machining apparatus 1 with as high accuracy as possible. The check operation according to the present embodiment is executed by the eyeglasses lens machining apparatus 1 to check a cause of an operation defect that has a possibility of occurring in the eyeglasses lens machining apparatus 1. More specifically, the check operation according to the present embodiment is an operation (that is, a dedicated operation for state check) executed separately from an operation (for example, at least one of a machining operation, a measurement operation, a communication operation, and the like) of the eyeglasses lens machining apparatus 1, which is actually necessary to be executed to fit the lens LE into an eyeglasses frame. Specifically, some of a plurality of check operations include an operation of driving a plurality of motors 110, 120, 145, 150, 160, 421, and 482 in a state in which the lens LE is not held by the lens holding portion 100. Therefore, the cause of the operation defect is estimated more appropriately.

Figure 4:
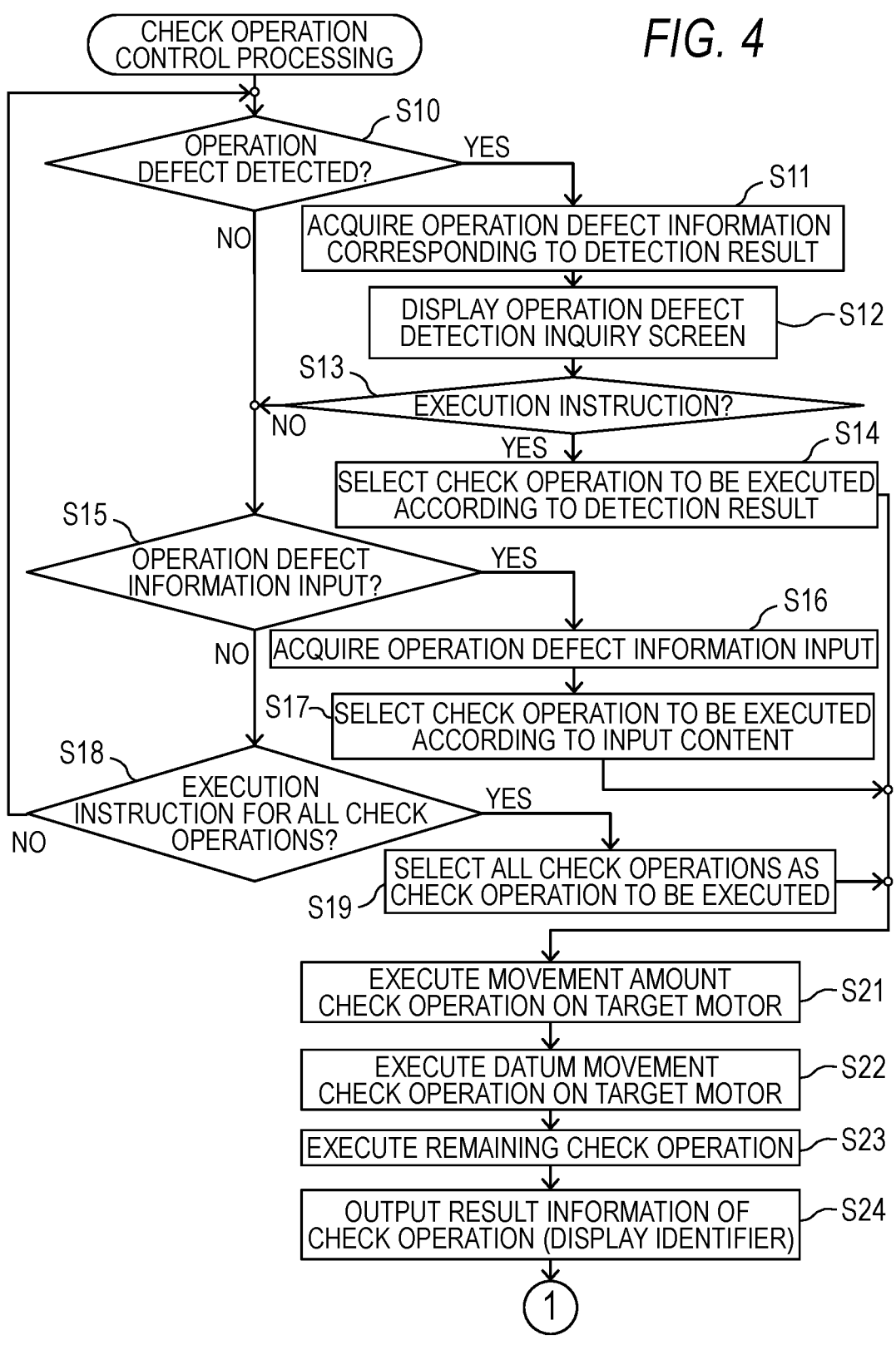
FIG. 4 is a flowchart of check operation control processing which is executed by the eyeglasses lens machining apparatus 1.

As illustrated in FIG. 4, the CPU 2 determines whether an operation defect is detected in the eyeglasses lens machining apparatus 1 (that is, whether an error occurs) (S10). The CPU 2 can detect the operation defect that occurs in the apparatus, based on, for example, signals from various actuators, sensors, and the like. In a case where the operation defect is detected (YES in S10), the CPU 2 acquires operation defect information (for example, an error code or the like) indicating a content of the detected operation defect (S11). The CPU 2 notifies a user of the fact that the operation defect (error) occurs, and inquires of the user whether to cause the eyeglasses lens machining apparatus 1 to execute a check operation. As an example, in the present embodiment, the CPU 2 causes the display unit 7 to display an operation defect detection inquiry screen 50 (S12). As illustrated in FIG. 5, a message for notifying the user that the operation defect (error) occurs, and an error code indicating the content of the operation defect are displayed on the operation defect detection inquiry screen 50. Further, a message for inquiring of the user whether to execute the check operation (in some cases, referred to as a "self-check") and "YES" and "NO" buttons are displayed on the operation defect detection inquiry screen 50. The user operates the "YES" button in a case of executing the check operation, and the "NO" button in a case of not executing the check operation. The error notification method and the like can be selected as appropriate. For example, the notification of the error may be given by a sound.

In a case where an instruction not to execute the check operation is input (NO in S13), the processing transitions to S15. In a case where an instruction to execute the check operation is input (YES in S13), the CPU 2 selects the check operation for checking a cause of the detected operation defect as the check operation to be actually executed. Specifically, the CPU 2 selects one or a plurality of check operations associated with the operation defect information (that is, the content of the operation defect detected in S10) acquired in S11 among the plurality of check operations that can be executed in the eyeglasses lens machining apparatus 1, as the check operation to be actually executed (S14). Therefore, the check operation to be executed by the eyeglasses lens machining apparatus 1 is automatically selected according to the content of the detected operation defect.

In a case where the operation defect is not detected (NO in S10), the CPU 2 determines whether the operation defect information is input by the user (S15). In the present embodiment, for example, in a case where a defect occurs in the machining of the lens LE executed by the eyeglasses lens machining apparatus 1, the user can input operation defect information related to the defect of the machining that occurs to the eyeglasses lens machining apparatus 1 via the operation unit 6 or the like, and then execute an appropriate check operation. In a case where the operation defect information is input (YES in S15), the CPU 2 acquires the input operation defect information (S16). The CPU 2 selects the check operation for checking the cause of the operation defect indicated by the input operation defect information as the check operation to be actually executed. Specifically, the CPU 2 selects one or a plurality of check operations associated with the input operation defect information, among the plurality of check operations that can be executed in the eyeglasses lens machining apparatus 1, as the check operation to be actually executed (S17).

The processing in S14 and S17 will be described in more detail. In the present embodiment, the check operation to be executed is associated in advance with a type of each of the operation defect information. Specifically, data (table data) in which each of a plurality of operation defect information is associated with the content of the check operation to be executed by the eyeglasses lens machining apparatus is stored in a database in advance. The CPU 2 selects a check operation associated with the acquired operation defect information in the table data as the check operation to be actually executed. The association of the type of each of the operation defect information with the check operation to be executed is appropriately updated by an operator of a manufacturer or the like, according to an analysis result of the cause of the occurrence of the operation defect. Therefore, it is easy to execute an appropriate check operation according to the content of the operation defect that occurs.

A specific example of a method of selecting a check operation to be actually executed according to a content of operation defect information will be described with reference to FIG. 6. FIG. 6 is an enlarged perspective view of an edge portion 60 of the machined lens L. In the example illustrated in FIG. 6, a bevel 61 is formed for fitting the lens LE to an eyeglasses frame. A foot portion 62 is formed between a base portion of the bevel 61 and front and back lens surfaces of the lens LE. Further, a chamfer portion 63 is formed on each of a front side rib portion and a back side rib portion of the lens LE. In some cases, a groove portion also may be formed instead of the bevel 61.

As a cause of a defect that occurs in a shape of the edge portion 60 including at least one of the bevel 61, the foot portion 62, the chamfer portion 63, and the groove portion, a case where the defect occurs in a relative movement of the lens LE and the machining tool in the X-axis direction, a case where the defect occurs in the measurement of the thickness of the lens LE, and the like are considered. For example, as illustrated in FIG. 6, in a case where a defect occurs in movement in the X-axis direction, a position of the bevel 61 formed on the lens LE may be deviated in the X-axis direction. In addition, even in a case where the thickness of the lens LE is not accurately measured, the position of the bevel 61 formed on the edge portion 60 has a possibility of being deviated.

Therefore, in S14 and S17 in the present embodiment, in a case where the content of the operation defect information is an operation defect related to the machining of the edge portion 60 of the lens LE (for example, the operation defect causing the defect of at least one of the shape, the position, and the size), the CPU 2 includes check operations for the X-axis movement motor 145 and the lens shape measurement unit (lens thickness measurement unit) 200 in the check operation to be actually executed. As a result, it is easier to more appropriately estimate the cause of the operation defect related to the machining of the edge portion 60.

With reference to FIG. 4, description will be continued. In a case where the operation defect information is not input by the user (NO in S15), the CPU 2 determines whether an instruction to execute all check operations among the plurality of check operations that can be executed by the eyeglasses lens machining apparatus 1 is input (S18). For example, in a case where maintenance of the eyeglasses lens machining apparatus 1 is executed, the user can input the instruction to execute all the check operations via the operation unit 6 or the like. In a case where the instruction is not input (NO in S18), the processing returns to S10. In a case where the instruction to execute all the check operations is input (YES in S18), the CPU 2 selects all the plurality of check operations that can be executed in the eyeglasses lens machining apparatus 1 as the check operation to be actually executed (S19).

In a case where the check operation is selected in any of S14, S17, and S19, the selected check operation is executed (S21 to S23). Specifically, in a case where at least one of the plurality of motors 110, 120, 145, 150, 160, 421, and 482 is selected as a target of the check operation, a movement amount check operation is executed on the target motor (S21). In the movement amount check operation, an instruction to move the target object by a predetermined amount is given to the target motor. The target object to be moved may be an object other than the lens LE (for example, the carriage, the shaft, or the like). The movement includes linear movement as well as rotational movement or the like. In a case where the movement amount check operation (S21) is executed, in processing in S24 to be described below, information indicating (for example, a difference or the like between two values) a relationship between the movement amount instructed to the motor and the movement amount of the target object that is actually moved (for example, the movement amount or the like detected by the encoder) is output as result information related to the check operation. As a result, it is easier to appropriately determine whether the cause of the operation defect is a defect related to the movement amount of the target object by the motor, based on the result of the operation check.

In addition, in a case where at least one of the plurality of motors 110, 120, 145, 150, 160, 421, and 482 is selected as a target of the check operation, a datum movement check operation is executed on the target motor (S22). In the datum movement check operation, the target object is repeatedly moved to a datum position by the motor selected as the target. The target object to be moved may be an object other than the lens LE. A type of movement may be rotational movement or the like instead of linear movement. In a case where the datum movement check operation (S22) is executed, in the processing in S24 described below, information indicating a detection result of the datum position by the datum sensor is output as result information related to the check operation. As a result, it is facilitated to appropriately resolve the defect of the datum detection that is likely to occur due to the machining waste or the like.

Next, the CPU 2 executes a check operation other than the movement amount check operation and the datum movement check operation, among the selected check operations (S23). In S23, for example, an operation of checking whether various signals are appropriately transmitted and received may be executed.

Next, the CPU 2 outputs the result information indicating the result of the executed check operation (S24). As a result, it becomes easier to execute appropriate measures on the eyeglasses lens machining apparatus 1, based on the result of the check operation. In the present embodiment, the CPU 2 outputs the result information by causing the display unit 7 to display an identifier (for example, a QR code (registered trademark) or the like) indicating the result information of the check operation.

(Processing of Entire System)

Figure 7:
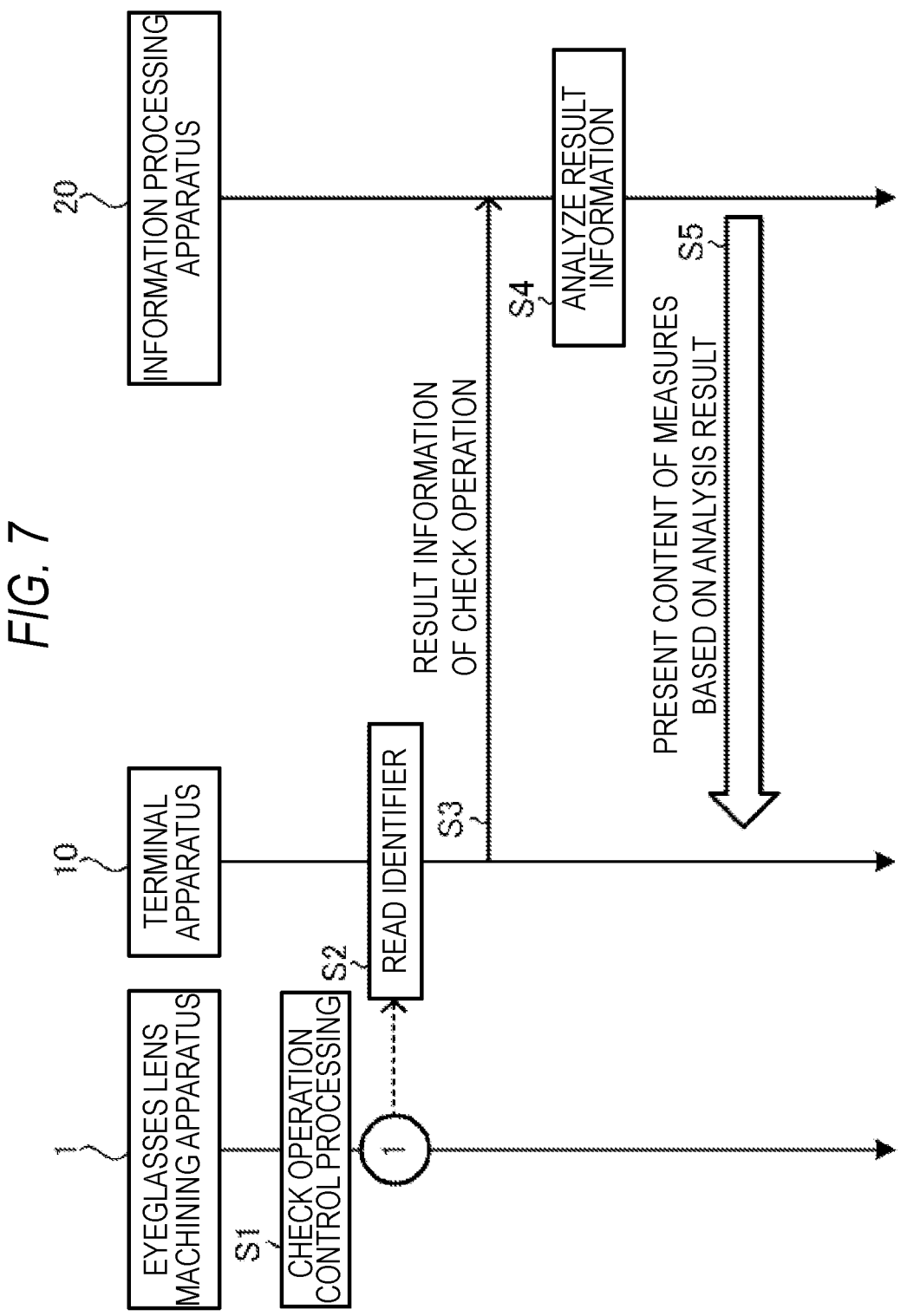
FIG. 7 is a sequence diagram illustrating an example of a flow of processing executed by the eyeglasses lens machining system 9.

With reference to FIG. 7, a flow of state management processing of the eyeglasses lens machining apparatus 1 in the entire eyeglasses lens machining system 9 will be described. As described above, when the check operation is performed in the check operation control processing (51, see FIG. 4) executed by the eyeglasses lens machining apparatus 1, the identifier indicating the result information of the check operation is displayed on the display unit 7. Here, the operator (for example, the user of the eyeglasses lens machining apparatus 1, and the like) causes the identifier reader provided in the terminal apparatus 10 to read the identifier displayed on the display unit 7 (S2). The terminal apparatus 10 transmits the result information acquired by reading the identifier to the information processing apparatus 20 via the network 30 (S3). Therefore, in the present embodiment, even when the eyeglasses lens machining apparatus 1 is not connected to the network, the operation check result information is appropriately transmitted to the information processing apparatus 20.

Next, the CPU 22 of the information processing apparatus 20 analyzes the acquired result information by using an analysis tool constructed in advance (S4). The analysis tool is constructed in advance, based on the analysis results of the operation defects that have occurred in the past in the eyeglasses lens machining apparatus. Therefore, even in a case where a skilled person who is good at analyzing result information cannot be involved in the work, the result information can be appropriately analyzed by the analysis tool.

As an example, in the present embodiment, spreadsheet software in which algorithms and standards for analyzing result information are defined is used as the analysis tool. The algorithms and standards are defined based on the experience of result information analysis by an operator (including skilled persons) in the past. The algorithms and standards will also be updated based on new analysis results. Therefore, the result information is analyzed with higher accuracy. As the analysis tool, a tool other than the spreadsheet software (for example, a mathematical model pre-trained by a machine learning algorithm to output analysis results by inputting result information) may be used.

Next, based on the analysis result of the result information of the operation check, a content of the measures to be executed is presented to the eyeglasses lens machining apparatus 1 (S5). The content of the measures to be executed may be determined by the information processing apparatus 20, or may be determined by an operator or the like who grasps the analysis result. Further, the content of the measures to be executed may be presented to the terminal apparatus 10 by e-mail or the like, or may be presented to the user of the eyeglasses lens machining apparatus 1 by telephone or the like.

The techniques disclosed in the embodiments described above are merely examples. Therefore, the techniques described in the embodiment described above can be modified. For example, only a part of the technique described in the embodiments described above can be executed. Specifically, the processing (S4) of analyzing the result information of the operation check using the analysis tool may be omitted. In this case, the result information of the operation check may be analyzed by the operator or the like. It is also possible for a device other than the information processing apparatus 20 (for example, the eyeglasses lens machining apparatus 1 or the terminal apparatus 10, and the like) to execute the analysis processing by the analysis tool. The result information of the check operation may be output by being displayed on a display unit (for example, the display unit 7 of the eyeglasses lens machining apparatus 1, and the like).

The processing of executing the check operation in S14, S17, S19, and S21 to S23 in FIG. 4 is an example of a "check operation execution step". The processing of outputting the check operation result information in S24 of FIG. 4 is an example of a "result output step". The processing of acquiring the operation defect information in S11 and S16 in FIG. 4 is an example of an "operation defect information acquisition step". The processing of analyzing the result information in SS4 in FIG. 7 is an example of an "analysis step".

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer-readable storage medium storing a state management program executed by a control apparatus configured to control an eyeglasses lens machining apparatus in order to manage a state of the eyeglasses lens machining apparatus, the state management program comprising instructions which, when executed by a processor of the control apparatus, cause the control apparatus to perform:

an operation defect information acquisition step of acquiring operation defect information indicating a content of an operation defect in the eyeglasses lens machining apparatus;

a check operation execution step of causing the eyeglasses lens machining apparatus to execute a check operation for checking a cause of the operation defect indicated by the operation defect information; and a result output step of outputting information indicating a result of the executed check operation;

wherein, in a case where a content of an operation defect indicated by the operation defect information is an operation defect related to machining on an edge shape of an eyeglasses lens, the check operation to be executed in the check operation execution step includes a check operation on a motor that moves the eyeglasses lens in a direction along lens holding shafts which hold the eyeglasses lens by interposing the eyeglasses lens between the lens holding shafts, and a lens thickness measurement unit which measures a thickness of the eyeglasses lens.

2. The non-transitory computer-readable storage medium according to claim 1, wherein in the check operation execution step, among a plurality of the check operations, one or a plurality of check operations associated with the operation defect information are executed by the eyeglasses lens machining apparatus.

3. The non-transitory computer-readable storage medium according to claim 1, wherein in a case where the eyeglasses lens machining apparatus detects an operation defect that occurs in the apparatus, in the operation defect information acquisition step, operation defect information indicating a content of the detected operation defect is acquired.

4. The non-transitory computer-readable storage medium according to claim 1, wherein in the operation defect information acquisition step, the operation defect information input to the control apparatus by a user is acquired.

5. The non-transitory computer-readable storage medium according to claim 1, wherein the check operation to be executed in the check operation execution step includes a movement amount check operation of performing an instruction for causing at least one motor provided in the eyeglasses lens machining apparatus to move a target object by a predetermined amount, and in a case where the movement amount check operation is executed, information indicating a relationship between a movement amount instructed to the motor and a movement amount of the target object actually moved is output in the result output step.

6. The non-transitory computer-readable storage medium according to claim 1, wherein the check operation to be executed in the check operation execution step includes a datum movement check operation of causing at least one motor provided in the eyeglasses lens machining apparatus to move a target object to a datum position, and in a case where the datum movement check operation is executed, information indicating a detection result of the datum position is output in the result output step.

7. The non-transitory computer-readable storage medium according to claim 1, wherein in the result output step, result information of the check operation is output by causing a display unit to display an identifier indicating the result information.

8. A state management method performed by a control apparatus that controls an eyeglasses lens machining apparatus in order to manage a state of the eyeglasses lens machining apparatus, the state management method comprising:

an operation defect information acquisition of acquiring operation defect information indicating a content of an operation defect in the eyeglasses lens machining apparatus;

a check operation execution of causing the eyeglasses lens machining apparatus to execute a check operation for checking a cause of the operation defect indicated by the operation defect information; and a result output of outputting information indicating a result of the executed check operation;

wherein, in a case where a content of an operation defect indicated by the operation defect information is an operation defect related to machining on an edge shape of an eyeglasses lens, the check operation to be executed in the check operation execution includes a check operation on a motor that moves the eyeglasses lens in a direction along lens holding shafts which hold the eyeglasses lens by interposing the eyeglasses lens between the lens holding shafts, and a lens thickness measurement unit which measures a thickness of the eyeglasses lens.

9. A state management method of an eyeglasses lens machining apparatus, which is performed in an eyeglasses lens machining system including the eyeglasses lens machining apparatus that machines an eyeglasses lens and an information processing apparatus that enables to acquire information related to the eyeglasses lens machining apparatus, the state management method comprising:

an operation defect information acquisition of acquiring operation defect information indicating a content of an operation defect in the eyeglasses lens machining apparatus;

a check operation execution in which the eyeglasses lens machining apparatus executes a check operation for checking a cause of the operation defect indicated by the operation defect information;

a result output in which the eyeglasses lens machining apparatus outputs result information indicating a result of the executed check operation; and an analysis in which the information processing apparatus acquires the result information output in the result output step, and analyzes the acquired result information by using an analysis tool constructed in advance;

wherein, in a case where a content of an operation defect indicated by the operation defect information is an operation defect related to machining on an edge shape of an eyeglasses lens, the check operation to be executed in the check operation execution includes a check operation on a motor that moves the eyeglasses lens in a direction along lens holding shafts which hold the eyeglasses lens by interposing the eyeglasses lens between the lens holding shafts, and a lens thickness measurement unit which measures a thickness of the eyeglasses lens.

* * * * *